Sept. 20, 1955

R. H. WALTER, JR 2,718,217

WATER HEATING APPARATUS

Filed Aug. 27, 1952

INVENTOR.
RICHARD H. WALTER, JR.
BY
Clark & Ott
ATTORNEYS

INVENTOR.
RICHARD H. WALTER, JR.
BY
Clark & Ott
ATTORNEYS

United States Patent Office 2,718,217
Patented Sept. 20, 1955

2,718,217

WATER HEATING APPARATUS

Richard H. Walter, Jr., Ramsey, N. J., assignor to Aeroil Products Co. Inc., South Hackensack, N. J., a corporation of New Jersey Application August 27, 1952, Serial No. 306,531

4 Claims. (Cl. 122—250)

This invention relates to a heat transfer apparatus for heating water in a continuously flowing stream as the same passes through one or more coils, and the invention has particular reference to an apparatus of said character for heating water to various degrees of temperature or for generating steam.

The invention has in view a heating apparatus in which water is forced under pressure through one or more coils surrounding a combustion chamber, and an object of the invention is to provide an improved arrangement of coils so as to effectively utilize the surface thereof for heating the water passing therethrough and by which the heated gases are circulated most efficiently about the coils.

Still another object of the invention is to provide an arrangement of coils and baffles by which the heated gases are caused to traverse definite paths about and between the coils for more efficient transfer of the heat thereto and for preventing stagnant pockets of the heated gases.

Still another object of the invention is to provide independent coils having inlet and outlet ends protruding through the walls of the apparatus and which are adapted to be optionally connected together in series or in parallel relation for heating one or more streams of water so as to vary the temperature, pressure and quality of the water or water vapor issuing from the coils.

To the end that the foregoing objects may be attained, the heating apparatus includes inner and outer banks of coils arranged with the banks disposed in inner and outer heat absorption chambers respectively. Spiral baffles are also provided for producing movement of the heated gases in spiral formation in one direction between the outer bank of coils and a casing defining the inner heat absorption chamber and in spiral formation in the opposite direction between the outer bank of coils and the wall of the apparatus.

With the foregoing and other objects in view, reference is now made to the following specification and accompanying drawings in which the preferred embodiments of the invention are illustrated.

Figure 1:
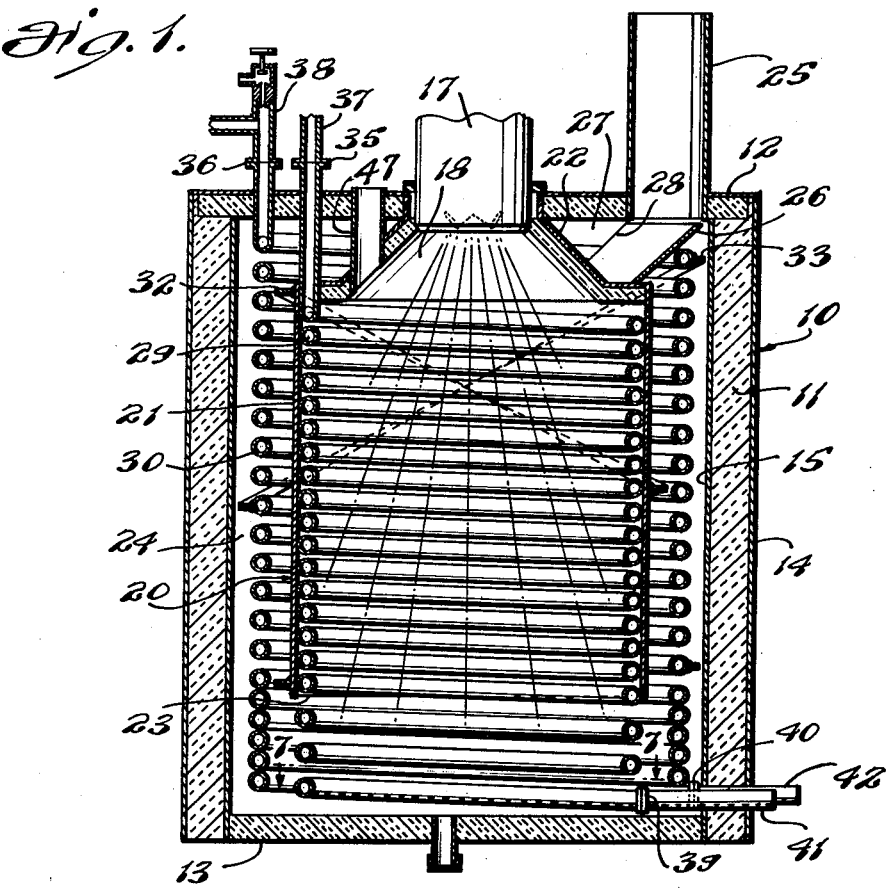
Fig. 1 is a vertical sectional view through a water heating apparatus constructed in accordance with the invention.
Figure 2:
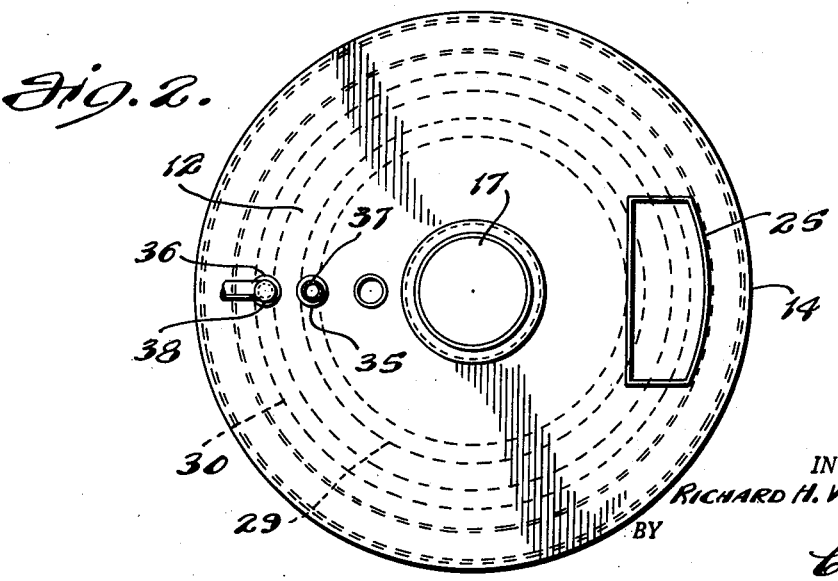
Fig. 2 is a top plan view thereof.

Referring to the drawings by characters of reference, the water heating apparatus includes a casing 10 comprising a side wall 11 of annular formation, a top wall 12 and a bottom wall 13. The said walls are constructed of insulation material and the side wall 11 and top wall 12 are enclosed within an outer metallic shell 14 and an inner metallic shell 15 covers the inner face of the side wall 11. Arranged in protruding relation in the top wall 12 is a burner head 17 having means (not shown) for mixing air with the fuel which is directed into a combustion and heat absorption chamber 18 through the open lower end 19 of the burner head. Electrodes (not shown) are provided for igniting the combustible fuel and the flame and gases of combustion are forced downwardly by the pressure of the air.

The combustion and heat absorption chamber 18 is formed by a metallic shell 20 consisting of an annular side wall 21 and a truncated conical-shaped top wall 22 which is secured to and depends from the top wall 12 of the casing 10 with the side wall 21 disposed concentrically within the side wall 11 of the casing. The side wall 21 is open at its lower end as at 23 which is spaced from the bottom wall 13 of the casing to permit of the flow of the heated gases of combustion about the lower end of the side wall 21 and upwardly through a heat absorption chamber 24 and the discharge thereof through a flue stack 25 secured to and extending upwardly through the top wall 12 of the casing. The heat absorption chamber 24 is of annular formation and is located between the side wall 11 of the casing and the side wall 21 of the metallic shell 20. A metallic baffle 26 of arcuate formation in section is arranged in angular formation in a flue chamber 27 located between the top wall 12 of the casing 10 and the top wall 22 of the metallic shell 20. The said baffle is secured to the top wall 22 and is arranged with the upper end thereof located below the flue stack 25. The inner side of said baffle is open as at 28 through which the gases of combustion pass and are directed upwardly by the baffle into the flue stack.

In order to provide means for heating one or more streams of water by the flame jet and the heated gases of combustion, one or more banks of coils are provided in the combustion and heat absorption chamber 18 and in the surrounding heat absorption chamber 24. As illustrated, two such banks of coils are provided in the present embodiment designated generally by the reference characters 29 and 30, each consisting of a plurality of helical convolutions. The inner bank 29 is arranged with the major portion thereof disposed within the combustion and heat absorption chamber 18 and in adjacent relation with the inner face of the side wall 21 of the metallic shell 20 and with the lower portion of the bank protruding from the open lower end of said side wall. Adjacent convolutions of the major upper portion of the inner bank are vertically disposed in narrowly spaced relation while the convolutions thereof protruding below the open end of the side wall 21 are vertically spaced apart to permit of the passage of the gases of combustion therebetween.

The outer bank 30 of the coils is arranged with the major portion thereof disposed within the heat absorption chamber 24 substantially centrally between the side wall 11 of the casing and the side wall 21 of the metallic shell and in concentric relation with the bank 29. The convolutions of said upper portion of the bank 30 are arranged in vertically spaced relation to permit the gases of combustion circulating about the convolutions thereof, while the convolutions of the lower portion of the bank below the metallic shell 20 are in contiguous relation to prevent impingement of the flame and the heated gases of combustion against the side wall 11 of the casing.

An inner spiral baffle 32 is secured in fixed position between the upper portion of the outer bank 30 and the inner face of the side wall 21 of the metallic shell 20 and extends spirally thereabout in one direction from the top to the bottom of said side wall. An outer spiral baffle 33 is secured in fixed position between the upper portion of the outer bank 30 and the inner face of the side wall 11 of the casing and extends spirally about the upper portion of said bank throughout the heat absorption chamber 24 in the other direction.

Figure 3:
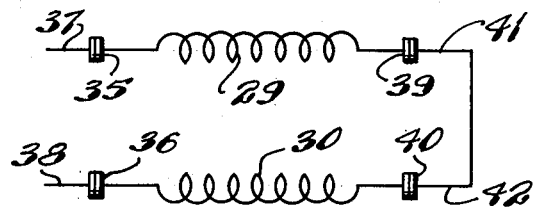
Fig. 3 is a diagrammatic view showing the manner of connecting the banks of coils together in series formation.
Figure 4:
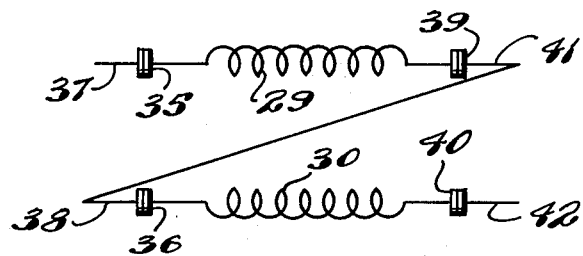
Fig. 4 is a schematic view showing a modified manner of connecting the banks of coils together in series formation.
Figure 5:
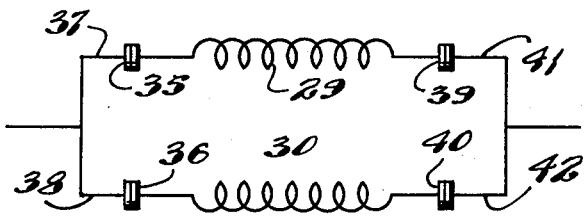
Fig. 5 is a schematic view showing the banks of coils connected together in parallel formation with a single inlet and a single outlet for the coils.
Figure 6:
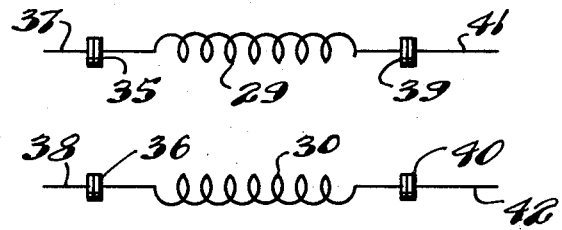
Fig. 6 is a schematic view showing a modified form of parallel arrangement of the coils with each of the coils having a separate inlet and a separate outlet.

As illustrated, the inner spiral baffle 32 is secured to the side wall 21 of the metallic shell 20 in any desired manner such as by spot welding or bolting the same thereto and which is removable with the said shell. The outer spiral baffle 33 is secured to the outer coil bank 30 and is removable with the said coil. The upper ends of the coil banks 29 and 30 protrude through the top wall 12 of the casing and are connected by unions 35 and 36 respectively with piping 37 and 38. The lower ends of the said coil banks are connected within the casing by unions 39 and 40 with piping 41 and 42 which protrudes through the side wall 11 of the casing, and the piping 37 and 38 and 41 and 42 may be connected together as illustrated in Figs. 3 to 6 of the drawings for connecting the coil banks together in series or parallel formation. As illustrated in Fig. 3 of the drawings, the piping 41 and 42 is connected together outside the casing 10 to connect the coils 29 and 30 in series for continuous flow of a stream of water in one direction through one of the coil banks and thence in the opposite direction through the other coil bank. In Fig. 4 of the drawings, the piping 41 outside of the casing 10 is connected with the piping 38 to provide a continuous stream of water flowing through the coil banks in the same direction. In Fig. 5 of the drawings, the piping 37 and 38 is connected together so as to provide a single inlet for the coil banks and the piping 41 and 42 is connected together to provide a single outlet to thereby connect the coil banks 29 and 30 in parallel, while in Fig. 6 of the drawings, the coil banks 29 and 30 have independent inlets and outlets so as to provide for the flow of separate streams of water through the coil banks. It is to be understood also that the upper or the lower ends of the coil banks may be either the inlet end or the outlet end of the coils.

By this construction and arrangement the flame and heated gases of combustion in turbulent formation are forced downwardly through the combustion and heat absorption chamber 18 and between the convolutions of the bank 29 protruding below the metallic shell 20 and thence the heated gases of combustion divide, a portion thereof flowing spirally upward between the bank 30 and the side wall 21 of the metallic shell 20 in a counterclockwise direction, the other portion thereof passing under the lowermost convolution of the outer bank 30 and thence upwardly between the said bank and the wall 11 of the casing spirally in a clockwise direction. The flow of the heated gases of combustion in this manner effects a transfer of the heat thereof to the banks of coils by radiation conduction and convection and the turbulent flow effects an efficient transfer of the heat. The arrangement of the baffles causes the stream of gases on opposite sides of the bank 30 to travel spirally in opposite directions and to circulate between the convolutions thereof to further increase the heating efficiency.

Figure 7:
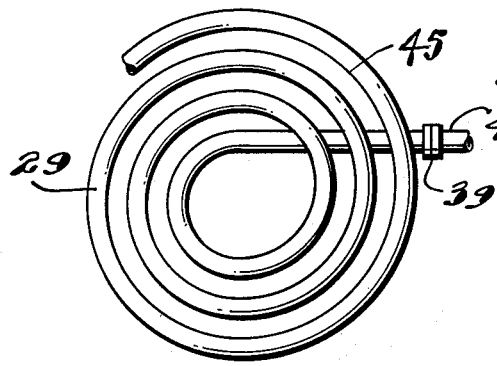
Fig. 7 is a fragmentary sectional view showing a modified form of one of the coils.

A further increase of efficiency and transfer of heat to the coils may be effected by the use of one or more helical coils arranged at an angle of 90° to the flow of the heated gases of combustion adjacent the bottom of the inner and outer coil banks and which may be connected with one or the other of the coil banks. As illustrated in Fig. 7 of the drawings, the inner coil bank 29 is provided with helical convolutions 45 which are connected with the lowermost convolution of said coil. The convolutions 45 are spaced apart to permit of the flow of the heated gases of combustion about the said convolutions and about the lower end of said coil.

The top wall 12 is removably connected with the side wall 11 so that the top wall may be disconnected from the side wall and removed therefrom. For this purpose the unions 35 and 36 are disconnected to permit of removing of the top wall 12 together with the metallic shell 20. Access may then be obtained to the heating apparatus for repairing or replacing the coil banks 29 and 30.

The metallic shell 20 is provided with a short pipe 47 which is secured to the top wall 22 thereof and extends upwardly through the top wall 12 of the casing 10. The open upper end of this pipe is adapted to be capped (not shown) as desired and the pipe is adapted for use for insertion of safety burner controls and for cleaning the inner coil bank 29.

What is claimed is:

1. In a water heating apparatus, a casing, a tubular shell arranged in upright relation within said casing with the lower end thereof spaced from the bottom of the casing, a burner head located in the upper end of said tubular shell for producing a downwardly directed flame jet, inner and outer coil banks, said inner coil bank being arranged with the upper portion thereof located within said tubular shell adjacent the wall thereof and with the lower end of said coil protruding from the lower end of said shell, said outer coil bank being arranged with the upper portion thereof disposed between the casing and the shell and with the lower end of said coil bank protruding below the lower end of the shell, an inner spiral baffle disposed in fixed position between the upper portion of said outer coil bank and the shell providing with said outer coil bank and said shell a spiral passageway for the gases of combustion between the inner periphery of said outer coil bank and the shell, and an outer spiral baffle located between said outer coil bank and said casing providing with said outer coil bank and said casing a spiral passageway for the gases of combustion between the outer periphery of said outer coil bank and said casing.

2. In a water heating apparatus, a casing, a tubular shell arranged in upright relation within said casing with the lower end thereof spaced from the bottom of the casing, a burner head located in the upper end of said tubular shell for producing a downwardly directed flame jet, inner and outer coil banks, said inner coil bank being arranged concentrically within said tubular shell and adjacent the wall thereof and said outer coil bank being located between said shell and the casing, an inner spiral baffle disposed in fixed position between said outer coil bank and the shell providing a spiral passageway between the inner periphery of said outer coil bank and said shell, an outer spiral baffle disposed in fixed position between said outer coil bank and said casing providing a spiral passageway between the outer periphery of said outer coil bank and said casing, and said baffles being of opposite spiral formation for directing the gases of combustion spirally in opposite directions within and without said outer coil bank.

3. In a water heating apparatus, a casing including a top wall and a side wall of annular formation in section, a tubular shell depending from said top wall with the wall of the shell located concentric with said side wall and with the shell disposed in spaced relation from the bottom of the casing, a burner head located in the upper end of said shell for producing a downwardly directed flame jet in said shell, inner and outer coil banks, said inner coil bank being of spiral formation and being arranged with the upper portion thereof located within said tubular shell and adjacent the wall thereof and with the lower portion of said coil bank protruding below said tubular shell, said outer coil bank being of spiral formation and arranged with the upper portion thereof disposed between said tubular shell and the annular wall of the casing and with the lower portion of said coil extending below said tubular shell, the convolutions of the inner coil bank below said shell being disposed in spaced relation and the convolutions of the corresponding lower portion of the outer coil bank being arranged in contiguous relation, an inner spiral baffle disposed in fixed position between said outer coil bank and the shell providing a spiral passageway between the inner periphery of said outer coil bank and said shell, an outer spiral baffle disposed in fixed position between said outer coil bank and said casing providing a spiral passageway between the outer periphery of said outer coil bank and said casing, and said baffles being of opposite spiral formation for directing the gases of combustion spirally in opposite directions within and without said outer coil bank.

4. In a water heating apparatus, a casing including a top wall and a side wall of annular formation in section, a tubular shell depending from said top wall with the wall of the shell located concentric with said side wall and with the shell disposed in spaced relation from the bottom of the casing, a burner head located in the upper end of said shell for producing a downwardly directed flame jet in said shell, inner and outer coil banks, said inner coil bank being of spiral formation and being arranged with the upper portion thereof located within said tubular shell and adjacent the wall thereof and with the lower portion of said coil bank protruding below said tubular shell, said outer coil bank being of spiral formation and arranged with the upper portion thereof disposed between said tubular shell and the annular wall of the casing and with the lower portion of said coil extending below said tubular shell, adjacent convolutions of the inner coil bank below said shell being disposed in spaced relation and adjacent convolutions of said upper portion of the outer coil bank being disposed in spaced relation and the adjacent convolutions of said lower portion of the outer coil bank being arranged in contiguous relation, an inner spiral baffle disposed in fixed position between said outer coil bank and the shell providing a spiral passageway between the inner periphery of said outer coil bank and said shell, an outer spiral baffle disposed in fixed position between said outer coil bank and said casing providing a spiral passageway between the outer periphery of said outer coil bank and said casing, and said baffles being of opposite spiral formation for directing the gases of combustion spirally in opposite directions within and without said outer coil bank.

References Cited in the file of this patent

UNITED STATES PATENTS

| | | |
|---|---|---|
| 1,516,087 | De Laitte | Nov. 18, 1924 |
| 1,732,876 | Billows | Oct. 22, 1929 |
| 1,814,605 | Mayr | July 14, 1931 |
| 2,008,528 | Warren | July 16, 1935 |
| 2,201,620 | La Mont | May 21, 1940 |
| 2,201,627 | La Mont | May 21, 1940 |